UNITED STATES PATENT OFFICE.

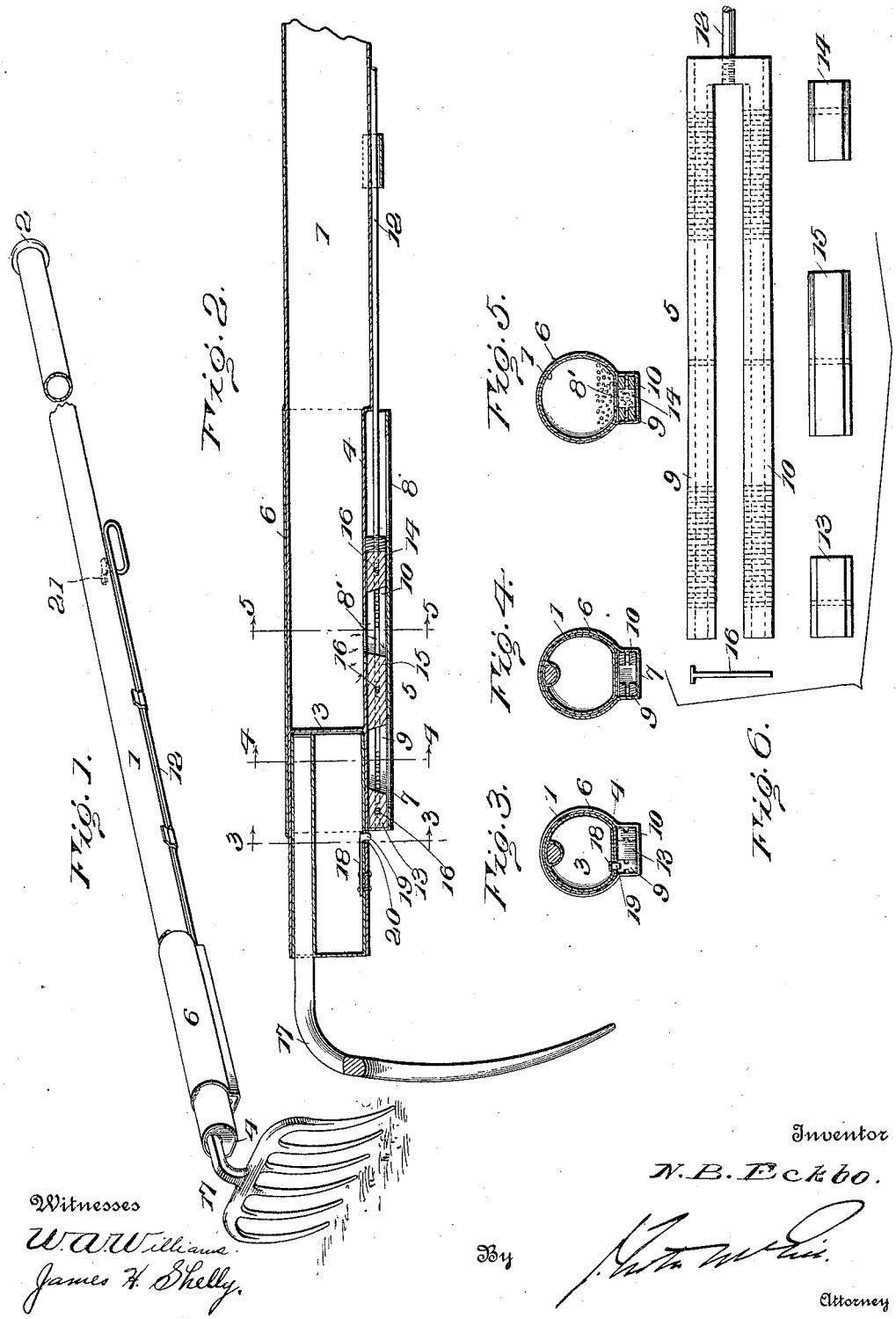

NILS B. ECKBO, OF OGDEN, UTAH.

SEED-PLANTER AND RAKE.

1,053,018. Specification of Letters Patent. Patented Feb. 11, 1913.

Application filed June 18, 1912. Serial No. 704,299.

*To all whom it may concern:*

Be it known that I, NILS B. ECKBO, of Ogden, in the county of Weber and State of Utah, have invented certain new and useful Improvements in Seed-Planters and Rakes; and I do hereby declare the following to be a full, clear, and exact description of the invention, such as will enable others skilled in the art to which it appertains to make and use the same.

The object of my invention is to provide an improved, simple and inexpensive seed planter and rake particularly adapted for use in reforestation work, whereby small seed such as tree, grass, etc., may be used and the desired number of seed wanted readily discharged; and a further object is to have the rake detachably connected to the planter so that when broken or worn a new one may be substituted, or in lieu thereof a hoe may be attached, as conditions may require.

Figure 1 is a view in perspective of my invention. Fig. 2 is a longitudinal sectional view, with parts broken away. Figs. 3, 4 and 5 are cross-sectional views on lines 3—3, 4—4 and 5—5, respectively, Fig. 2. Fig. 6 shows the valve removed.

Referring to the drawings, 1 designates a tubular handle which forms a receptacle for the seed, a screw cap 2 closing one end of the receptacle and a cross head 3 the opposite end. One side of the receptacle, near the lower end, is flattened, as at 4, to form a bearing for a valve 5 which slides within a depending portion of a casing 6 which surrounds the receptacle near its lower end, the casing being secured thereto by soldering, or in any other manner. In the bottom of this casing, near each end, are discharge openings 7 and 8, respectively, and midway between these openings the receptacle has a discharge opening 8'.

The valve 5 preferably comprises two spaced apart parallel bars 9, 10, connected at one end by a cross piece into which is screwed the end of an operating rod 12 which parallels the tubular handle and is held in position by guides. The bars 9 and 10 are grooved on their inner and outer sides, the inner grooves being designed to accommodate guiding and supporting lugs of two end blocks, 13 and 14, and a central block 15. These blocks are spaced apart and held between the bars 9 and 10 to form two pockets for the seed, the blocks being held in position by headed pins 16 passing each through one of a series of openings in the bars and through an opening in each of the blocks. Preferably, the block 15 remains in its central position and the end blocks are adjusted relatively thereto to regulate the size of the seed pockets in the valve, according to the character of the seed. The headed ends of the pins fit within the outer grooves and form no obstruction to the sliding of the valve.

17 designates a rake which is preferably formed with the usual tines and a head which is of tubular form flattened on its underside to fit within the end of the tubular receptacle of the seeder. The head of the rake is held in the receptacle by a flat spring 18 secured at one end to the inner side of the rake head having a lug 19 on its free end which projects out through such tube for taking in a cut-out 20 of the receptacle when the rake head is inserted. The lug of this spring serves also as a stop to limit the movement of the valve 5 in one direction, its movement in the opposite direction being limited by a shoulder on the receptacle.

In practice, when it is determined what character of seed is to be used, the valve blocks 13 and 14 are adjusted to regulate the size of the pockets. This may be accomplished by pressing in on the spring 18 to remove its lug 19 from the path of the valve and forcing the latter outwardly from the casing where the blocks may be readily adjusted. The valve is then returned to position with the opening between the blocks 14 and 15 adjacent the opening in the tubular receptacle. The latter is then filled with seed and the cap screwed in place. Seed will fall into the exposed pocket beneath the opening in the receptacle and will be supported by the casing 6 until the operator prepares the ground with the rake. When ready he pulls upwardly on the rod 12 bringing the filled pocket of the valve opposite the upper opening in the casing 6 from which the seed will be discharged. As this is taking place, the lower pocket, formed by the blocks 13 and 15, will be in line with the opening in the receptacle and will fill with seed, which latter will be emptied through the lower opening in the casing when the rod 12 is pushed downwardly to return the valve to its former position. When the seeder is not in use the valve may be locked against accidental movement by turning the rod 12 to engage its handle with a clip 21 on the tubular receptacle.

It is manifest that the rake may be detached and a new one or a hoe substituted, or it may be omitted.

I claim as my invention:—

1. A seed planter comprising a hollow handle forming a seed receptacle, and having a discharge opening near its lower end, a valve for controlling such opening, said valve having a series of adjustable pockets for receiving seed from said receptacle, and a casing for said valve having an outlet near each end through which seed is discharged from said valve.

2. A seed planter comprising a hollow handle forming a seed receptacle, and having a discharge opening near its lower end, a valve for controlling such opening, said valve having a series of adjustable pockets for receiving seed from said receptacle, a casing for said valve having an outlet near each end through which seed is discharged from said valve, and an earth working tool designed to fit in one end of said hollow handle.

3. A seed planter comprising a hollow handle forming a seed receptacle, and having a discharge opening near its lower end, a valve for controlling such opening, said valve having a plurality of pockets for receiving seed from said receptacle, a casing for said valve having an outlet near each end through which seed is discharged from said valve, and an earth working tool designed to fit in one end of said hollow handle.

4. A seed planter comprising a hollow handle forming a seed receptacle, and having a discharge opening near its lower end, a valve for controlling such opening, said valve comprising spaced apart rods, blocks mounted between said rods with intervening spaces forming pockets for receiving seed from said receptacle, and a casing for said valve having an outlet near each end through which seed is discharged from said valve.

5. A seed planter comprising a hollow handle forming a seed receptacle, and having a discharge opening near its lower end, a valve for controlling such opening, said valve comprising spaced apart rods, blocks adjustably mounted between said rods with intervening spaces forming pockets for receiving seed from said receptacle, a casing for said valve having an outlet near each end through which seed is discharged from said valve, an earth working tool designed to fit in one end of said hollow handle, and means for limiting the downward movement of said valve.

In testimony whereof, I have signed this specification in the presence of two subscribing witnesses.

NILS B. ECKBO.

Witnesses:
  DUNCAN M. LANG,
  WILLIAM N. SPARHAWK.

---

Copies of this patent may be obtained for five cents each, by addressing the "Commissioner of Patents, Washington, D. C."